United States Patent
Eastman et al.

(10) Patent No.: US 8,070,651 B2
(45) Date of Patent: Dec. 6, 2011

(54) WORK MACHINE COAST AND BRAKE CONTROL WITH AN INFINITELY VARIABLE TRANSMISSION

(75) Inventors: Briton T. Eastman, Coffeyville, KS (US); Christopher J. Maifield, Dubuque, IA (US)

(73) Assignee: Deere & Company, Moline, IL (US)

( * ) Notice: Subject to any disclaimer, the term of this patent is extended or adjusted under 35 U.S.C. 154(b) by 1032 days.

(21) Appl. No.: 11/952,571

(22) Filed: Dec. 7, 2007

(65) Prior Publication Data
US 2009/0149296 A1   Jun. 11, 2009

(51) Int. Cl.
*F16H 61/21* (2006.01)
(52) U.S. Cl. ............. 477/68; 477/94; 477/118; 477/905
(58) Field of Classification Search .................... 477/68, 477/118, 94, 905
See application file for complete search history.

(56) References Cited

U.S. PATENT DOCUMENTS

| | | | |
|---|---|---|---|
| 4,368,798 A | 1/1983 | Meyerle et al. | |
| 4,635,494 A | 1/1987 | Conklin | |
| 4,735,597 A | 4/1988 | Cadee | |
| 4,967,610 A * | 11/1990 | Sasajima et al. ............... | 477/68 |
| 5,052,986 A | 10/1991 | Jarchow et al. | |
| 5,267,911 A | 12/1993 | Meyerle | |
| 5,514,046 A | 5/1996 | Petersmann et al. | |
| 5,695,422 A | 12/1997 | Otten | |
| 6,357,413 B1 | 3/2002 | Ito et al. | |
| 2003/0070859 A1 * | 4/2003 | Dahl et al. .................... | 180/305 |
| 2006/0150767 A1 * | 7/2006 | Shah ............................ | 74/730.1 |
| 2006/0150809 A1 * | 7/2006 | Shah ............................. | 91/472 |
| 2007/0272455 A1 | 11/2007 | Lang et al. | |

* cited by examiner

*Primary Examiner* — Sherry Estremsky

(57) ABSTRACT

A work machine includes an IC engine having an output, an IVT having an input coupled with the IC engine output, and a ground speed actuator. A desired speed sensor associated with the ground speed actuator provides an output signal indicating a slower ground speed. At least one electrical processing circuit is configured for increasing an input/output (I/O) ratio of the IVT, dependent upon the sensor output signal, such that a net torque transfer back-driven from the IVT input to the IC engine output is substantially zero.

15 Claims, 2 Drawing Sheets

WORK MACHINE COAST AND BRAKE CONTROL WITH AN INFINITELY VARIABLE TRANSMISSION

FIELD OF THE INVENTION

The present invention relates to work machines, and, more particularly, to work machines including an internal combustion engine coupled with an infinitely variable transmission (IVT).

BACKGROUND OF THE INVENTION

A work machine, such as a construction work machine, an agricultural work machine or a forestry work machine, typically includes a prime mover in the form of an internal combustion (IC) engine. The IC engine may either be in the form of a compression ignition engine (i.e., diesel engine) or a spark ignition engine (i.e., gasoline engine). For most heavy work machines, the prime mover is in the form of a diesel engine having better lugging, pull-down and torques characteristics for associated work operations.

An IC engine may be coupled with an IVT which provides continuous variable output speed from 0 to maximum in a stepless fashion. An IVT typically includes hydrostatic and mechanical gearing components. The hydrostatic components convert rotating shaft power to hydraulic flow and vice versa. The power flow through an IVT can be through the hydrostatic components only, through the mechanical components only, or through a combination of both depending on the design and output speed.

One example of an IVT for use in a work machine is a hydromechanical transmission which includes a hydraulic module coupled with a planetary gear set. Another example of an IVT for a work machine is a hydrostatic transmission which includes a hydraulic module coupled with a gear set.

The deceleration rate with an IVT can be more abrupt than a traditional torque converter powershift transmission when the ground speed control pedal is fully released. The IVT ratio of input to output speed increases as the speed control pedal is released and the vehicle inertia back drives the engine and abruptly slows down the vehicle. This brings the vehicle to a stop quickly and is undesirable to the operator.

What is needed in the art is a work machine with an IVT which is configured and controlled to allow the work machine to be slowed down or stopped without abrupt and objectionable deceleration.

SUMMARY OF THE INVENTION

The invention in one form is directed to a work machine including an IC engine having an output, an IVT having an input coupled with the IC engine output, and a ground speed actuator. A desired speed sensor associated with the ground speed actuator provides an output signal indicating a slower ground speed. At least one electrical processing circuit is configured for increasing an input/output (I/O) ratio of the IVT, dependent upon the sensor output signal, such that a net torque transfer back-driven from the IVT input to the IC engine output is substantially zero.

The invention in another form is directed to a method of operating a work machine including an IC engine having an output coupled with an input to an IVT. The method includes the steps of: moving a ground speed actuator to a position corresponding to a slower ground speed of the work machine; sensing the position of the ground speed actuator and providing an output signal indicating the slower ground speed; and increasing an I/O ratio of the IVT, dependent upon the sensed output signal, such that a net torque transfer back-driven from the IVT input to the IC engine output is substantially zero.

DETAILED DESCRIPTION OF THE INVENTION

Figure 1:
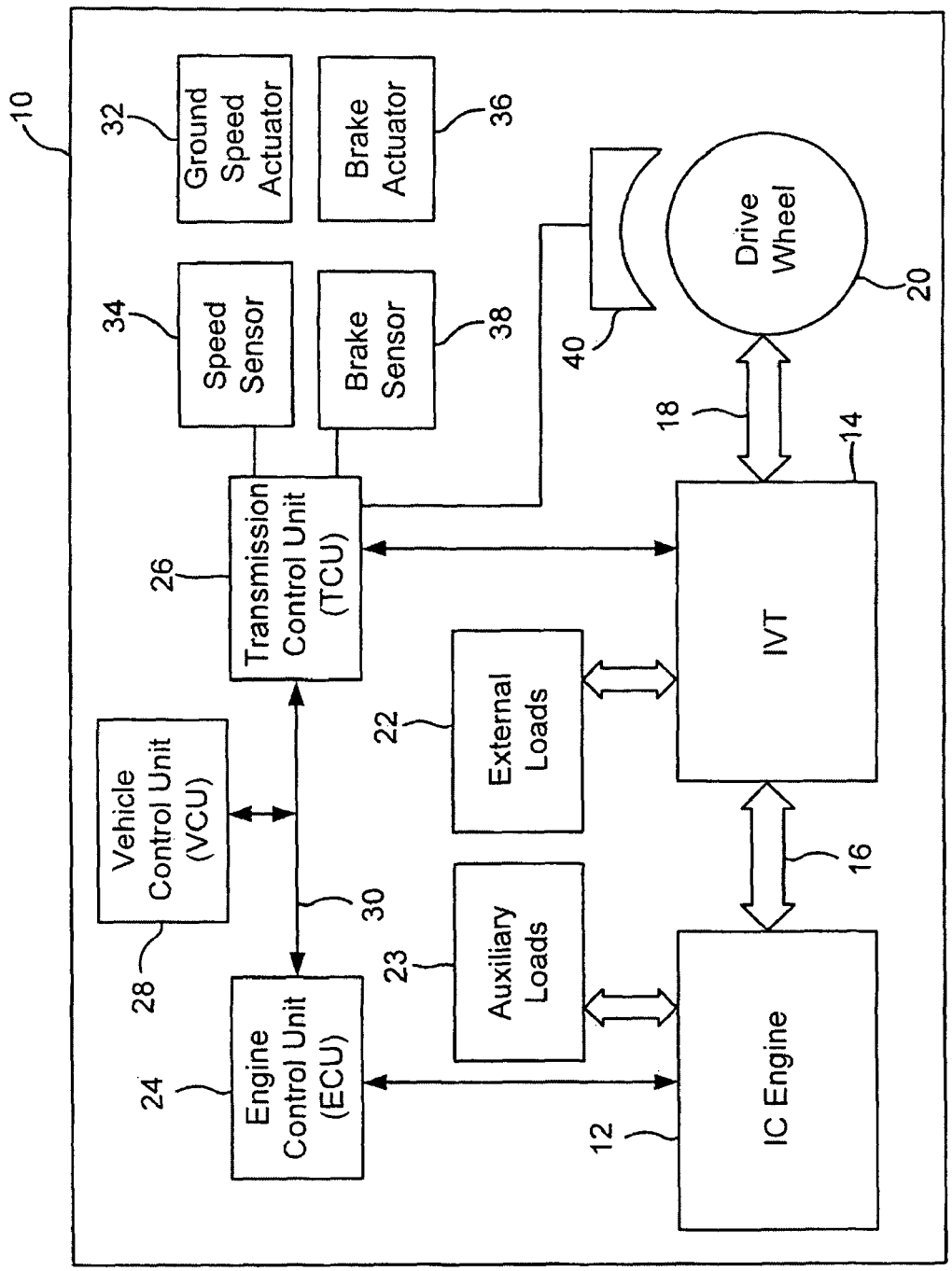
FIG. 1 is a schematic illustration of an embodiment of a work machine of the present invention.

Referring now to FIG. 1, there is shown a schematic illustration of an embodiment of a work machine 10 of the present invention. Work machine 10 is assumed to be a construction work machine such as a John Deere front end loader, but could be a different type of work machine such as an agricultural, forestry, mining or industrial work machine.

Work machine 10 includes an IC engine 12 which is coupled with an IVT 14, typically directly to the flywheel and flywheel housing of IC engine 12, or remotely via a drive shaft that connects the IC engine output to the IVT input. IC engine 12 is assumed to be a diesel engine in the illustrated embodiment, but could also be a gasoline engine, propane engine, etc. IC engine 12 is sized and configured according to the application.

IVT 14 may be of conventional design, and thus is not described in great detail herein. IVT 14 has an output which is coupled with at least one other downstream drive train component 18, which in turn is coupled with a plurality of drive wheels 20, one of which is shown in FIG. 1. Of course, it will be appreciated that in the case of a track-type work vehicle, drive train component 18 may be coupled with a ground engaging track.

IVT 14 also provides output power to one or more external loads 22, which in turn thus provide an additional load on IC engine 12. External loads 22 typically are in the form of hydraulic loads, such as a front end loader boom, bucket, and steering functions, backhoe hydraulic functions, grain unloading auger function, tree felling saw motor, etc. IC engine 12 also provides power directly to auxiliary loads 23 such as a cooling fan or fans, air conditioning compressor, alternator, air compressor, or hydraulic pumps that provide power to non-implement functions. The total load placed upon IC engine 12 thus is a function of tractive loads, external hydraulic loads and auxiliary loads.

Engine control unit (ECU) 24 electronically controls operation of IC engine 12, and is coupled with a plurality of sensors and actuators (not specifically shown) associated with operation of IC engine 12. For example, ECU 24 may be coupled with sensors indicating engine control parameters such as an air flow rate within one or more intake manifolds, engine speed, crankshaft position, fueling rate and/or timing, exhaust gas recirculation (EGR) rate, coolant temperature, oil pressure, turbocharger blade position, etc. Additionally, ECU 24 may receive output signals from vehicle control unit (VCU) 28 representing vehicle control parameters input by an operator, such as, e.g., a commanded ground speed using a ground speed actuator or a speed range using a speed range select lever. ECU 24 calculates threoretical gross engine power and distributes this value to controller area network (CAN) bus 30. ECU 24 may be coupled with actuators that control fuel quantity, fuel injection timing, EGR valve position, etc.

Similarly, transmission control unit (TCU) 26 electronically controls operation of IVT 14, and is coupled with a plurality of sensors associated with operation of IVT 14. ECU 24 and TCU 26 are coupled together via a bus structure providing two-way data flow, such as CAN bus 30.

VCU 28 may receive signals from external loads 22 and auxiliary loads 23 that represent significant loads. Such signals can represent actual loads or allow calculation of external and auxiliary loads. Load values may be distributed to CAN bus 30.

Although the various electronic components such as ECU 24, TCU 26 and VCU 28 are shown coupled together using wired connections, it should also be understood that wireless connections may be used for certain applications.

Ground speed actuator 32 is moved by an operator to a position corresponding to a desired ground speed of work machine 10. In the embodiment shown, ground speed actuator 32 is assumed to be a foot pedal which is biased to a neutral position, and depressed and held by an operator at a position corresponding to a desired ground speed. It is to be understood, however, that ground speed actuator 32 could be differently configured, such as a rocker type foot pedal including both forward and reverse functions, or a hand lever.

As indicated above, ground speed actuator 32 is assumed to be a movable mechanical element in the form of a foot pedal. The position of the foot pedal is electronically sensed using desired speed sensor 34 and transmitted to TCU 26. The output signal representing the position of the foot pedal can be directly interpreted to a corresponding desired ground speed of work machine 10. Alternatively, ground speed actuator 32 could be an actual mechanical linkage which is mechanically connected to IVT 14 and/or other drive train component 18. Further, desired speed sensor 34 could transmit a signal directly to VCU 28 representing the position of ground speed actuator 32, and in turn the desired ground speed of work machine 10.

Brake actuator 36 is moved by an operator to a position corresponding to a desired degree of braking of work machine 10. In the embodiment shown, brake actuator 36 is assumed to be a foot pedal which is biased to a neutral position, and depressed and held by an operator at a position corresponding to a desired deceleration rate. The position of the foot pedal is electronically sensed using brake sensor 38 and transmitted to TCU 26 (or alternatively VCU 28). The output signal representing the position of the foot pedal can be directly interpreted to a corresponding application pressure of service brakes 40.

Figure 2:
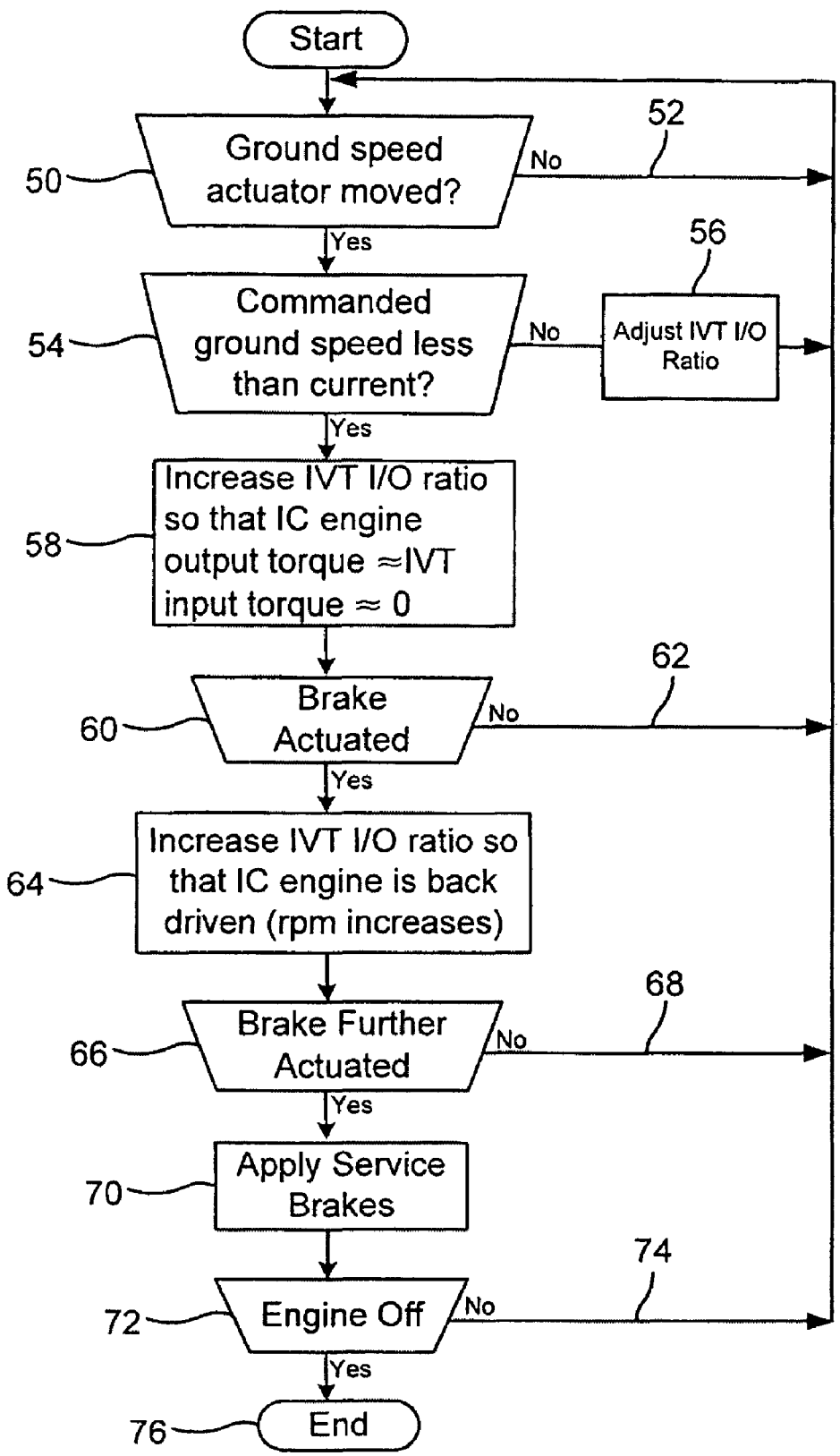
FIG. 2 illustrates a flowchart of an embodiment of the method of operation of a work machine of the present invention.

Referring now to FIG. 2, an embodiment of the method of the present invention for operation of work machine 10 will be described in greater detail. At decision block 50, a query is made as to whether the ground speed actuator 32 (e.g., foot pedal) has been moved. If the ground speed actuator 32 has not been moved (line 52), then a wait state occurs. On the other hand, if the ground speed actuator 32 has been moved (decision block 54), then a determination is made as to whether the desired ground speed is to be increased or decreased. In the event the ground speed is to be increased (block 56), the I/O ratio of IVT 14 is simply adjusted accordingly.

Conversely, if the ground speed is to be decreased (block 58), then the I/O ratio of IVT 14 is increased until the net torque transfer back-driven from the input of IVT 14 to the output of IC engine 12 is approximately zero. To this end, TCU 26 monitors the output torque from IC engine 12 via ECU 24, and external and auxiliary loads via VCU 28. External and auxiliary load requirements are deducted from the gross output torque of IC engine 12 to determine the net torque to IVT 14. TCU 26 adjusts the I/O ratio of IVT 14 accordingly to maintain net torque transfer from IC engine 12 to IVT 14 of substantially zero. This allows work machine 10 to coast without abrupt slowing which may be more desirable to the operator. Once the desired ground speed is attained, the I/O ratio of IVT 14 is adjusted to allow positive torque transfer from IC engine 12 to IVT 14 to maintain ground speed.

Between decision block 54 and block 58, it is possible to optionally query whether the coast mode described in block 58 should be engaged, or whether the ground speed should simply be reduced without engaging the coast mode. In other words, it is possible to only engage the coast mode if the desired drop in ground speed exceeds a predefined threshold drop in desired ground speed (e.g., percentage or absolute value drop). For example, assume that work machine 10 is a combine and an operator is harvesting soybeans. As evening approaches the stems typically start to toughen and it may be necessary to slow the ground speed slightly to avoid clogging the knives on the sickle bar. If the combine is slowed, e.g., from 4.5 to 4.3 mph to accommodate running conditions, it is not likely necessary to engage the coast mode given the small drop in ground speed. In this instance, control could pass from the optional decision block interposed between decision block 54 and block 58 directly to block 56 for adjustment of the I/O ratio to carry out the ground speed reduction.

At decision block 60, a query is made as to whether the brake actuator 36 (e.g., brake pedal) has been depressed. If not, then control loops back to the input to decision block 50 (line 62). If the brake actuator 36 has been depressed, then the I/O ratio of IVT 14 is further increased such that IC engine 12 is back driven (engine operating speed (RPM) increases) resulting in engine braking of work machine 10 (block 64). Engine braking prevents heat generation in and prolongs the life of service brakes 40. The engine speed can be increased to a maximum predetermined engine speed as the brake pedal is further depressed to achieve additional engine braking.

At decision block 66, a query is made as to whether brake actuator 36 has been further depressed by an operator to a point past that of the maximum engine speed for engine braking. If not, then control loops back to the input to decision block 50 (line 68). If the brake actuator has been further depressed, then the service brakes are applied (block 70).

For the engine braking described in block 64 and the engagement of service brakes described in block 70, it is also possible to utilize a threshold dependency, similar to the threshold dependency described above with regard to the coast mode.

The above control logic repeats while IC engine 12 is in an ON state (decision block 72 and line 74), and terminates when IC engine 12 is turned OFF (block 76).

Having described the preferred embodiment, it will become apparent that various modifications can be made without departing from the scope of the invention as defined in the accompanying claims.

The invention claimed is:

1. A work machine, comprising:
  an internal combustion (IC) engine having an output;
  an infinitely variable transmission (IVT) having an input coupled with said IC engine output;
  a ground speed actuator;
  a desired speed sensor associated with said ground speed actuator and providing an output signal indicating a slower ground speed; and
  at least one electrical processing circuit configured for increasing an input/output (I/O) ratio of said IVT, dependent upon said sensor output signal, such that a net torque transfer back-driven from said IVT input to said IC engine output is substantially zero.

2. The work machine of claim 1, including a brake actuator and a brake sensor associated with said brake actuator, said brake sensor providing a first output signal indicating an actuation of said brake actuator, said at least one electrical processing circuit configured for increasing said I/O ratio of said IVT, dependent upon said first output signal, such that said IVT input back drives said IC engine output.

3. The work machine of claim 2, further including at least one service brake, and wherein said brake sensor provides a second output signal indicating a further actuation of said brake actuator, said at least one electrical processing circuit configured for actuating said service brake, dependent upon said second output signal.

4. The work machine of claim 2, wherein said brake actuator comprises a brake pedal.

5. The work machine of claim 1, wherein said ground speed actuator comprises one of a foot pedal and a hand lever.

6. The work machine of claim 1, wherein said at least one electrical processing circuit includes an engine control unit (ECU) associated with said IC engine, and a transmission control unit (TCU) associated with said IVT, said TCU controlling said I/O ratio of said IVT.

7. A method of operating a work machine including an internal combustion (IC) engine having an output coupled with an input to an infinitely variable transmission (IVT), said method comprising the steps of:
  moving a ground speed actuator to a position corresponding to a slower ground speed of said work machine;
  sensing said position of said ground speed actuator and providing an output signal indicating said slower ground speed; and
  increasing an input/output (I/O) ratio of said IVT, dependent upon said sensed output signal, such that a net torque transfer back-driven from said IVT input to said IC engine output is substantially zero.

8. The method of operating a work machine of claim 7, including the steps of:
  actuating a brake actuator;
  sensing said actuation of said brake actuator and providing a first output signal indicating an actuation of said brake actuator; and
  increasing said I/O ratio of said IVT, dependent upon said first output signal, such that said IVT input back drives said IC engine output.

9. The method of operating a work machine of claim 8, further including the steps of:
  sensing a further actuation of said brake actuator and providing a second output signal indicating said further actuation of said brake actuator; and
  actuating at least one service brake, dependent upon said second output signal.

10. The method of operating a work machine of claim 8, wherein said brake actuator comprises a brake pedal.

11. The method of operating a work machine of claim 7, wherein said ground speed actuator comprises one of a foot pedal and a hand lever.

12. The method of operating a work machine of claim 7, wherein said step of increasing said I/O ratio is carried out using an engine control unit (ECU) associated with said IC engine, and a transmission control unit (TCU) associated with said IVT, said TCU controlling said I/O ratio of said IVT.

13. A work machine, comprising:
  an internal combustion (IC) engine having an output;
  an infinitely variable transmission (IVT) having an input coupled with said IC engine output;
  a brake actuator;
  a brake sensor associated with said brake actuator, said brake sensor providing a first output signal indicating an actuation of said brake actuator;
  at least one electrical processing circuit configured for increasing an input/output (I/O) ratio of said IVT, dependent upon said first output signal, such that said IVT input back-drives said IC engine output; and
  at least one service brake, and wherein said brake sensor provides a second output signal indicating a further actuation of said brake actuator, said at least one electrical processing circuit configured for actuating said service brake, dependent upon said second output signal.

14. The work machine of claim 13, wherein said brake actuator comprises a brake pedal.

15. The work machine of claim 13, wherein said at least one electrical processing circuit includes an engine control unit (ECU) associated with said IC engine, and a transmission control unit (TCU) associated with said IVT, said TCU controlling said I/O ratio of said IVT.

* * * * *